US012717189B2

(12) United States Patent
Dong et al.

(10) Patent No.: US 12,717,189 B2
(45) Date of Patent: Aug. 25, 2026

(54) LIQUID CRYSTAL PANEL AND MANUFACTURING METHOD THEREOF AND DISPLAY APPARATUS

(71) Applicants: HEFEI BOE DISPLAY TECHNOLOGY CO., LTD., Hefei (CN); BOE TECHNOLOGY GROUP CO., LTD., Beijing (CN)

(72) Inventors: Wenbo Dong, Beijing (CN); Jianming Liu, Beijing (CN); Chaoyue Wang, Beijing (CN); Xunwang Yu, Beijing (CN); Huiming Wang, Beijing (CN); Xinyue He, Beijing (CN); Xiuqin Yang, Beijing (CN); Peng Zhao, Beijing (CN); Mingqi Zhang, Beijing (CN)

(73) Assignees: HEFEI BOE DISPLAY TECHNOLOGY CO., LTD., Hefei (CN); BOE TECHNOLOGY GROUP CO., LTD., Beijing (CN)

( * ) Notice: Subject to any disclaimer, the term of this patent is extended or adjusted under 35 U.S.C. 154(b) by 95 days.

(21) Appl. No.: 18/579,978

(22) PCT Filed: Feb. 14, 2023

(86) PCT No.: PCT/CN2023/075937
§ 371 (c)(1),
(2) Date: Jan. 17, 2024

(87) PCT Pub. No.: WO2024/168523
PCT Pub. Date: Aug. 22, 2024

(65) Prior Publication Data
US 2025/0085594 A1 Mar. 13, 2025

(51) Int. Cl.
*G02F 1/1339* (2006.01)
*G02F 1/1333* (2006.01)
*G02F 1/1335* (2006.01)

(52) U.S. Cl.
CPC ...... *G02F 1/1339* (2013.01); *G02F 1/133317* (2021.01); *G02F 1/133502* (2013.01); *G02F 1/133526* (2013.01); *G02F 1/133528* (2013.01); *G02F 1/133553* (2013.01)

(58) Field of Classification Search
CPC ............. G02F 1/133608; G02F 1/1339; G02F 1/133317; G02F 1/133502; G02F 1/133526; G02F 1/133528; G02F 1/133553
(Continued)

(56) References Cited

U.S. PATENT DOCUMENTS

2004/0209007 A1* 10/2004 Satake ..................... G02B 1/16 428/1.3
2008/0284942 A1* 11/2008 Mahama ........... G02F 1/133611 349/64
(Continued)

FOREIGN PATENT DOCUMENTS

CN 101266315 A 9/2008
CN 104199574 A 12/2014
(Continued)

*Primary Examiner* — David Y Chung
(74) *Attorney, Agent, or Firm* — Dilworth & Barrese, LLP.; Michael J. Musella, Esq.

(57) ABSTRACT

A liquid crystal panel and a manufacturing method thereof, and a display apparatus are disclosed. The liquid crystal panel includes a liquid crystal cell, a first adhesive layer, a first polarizer, a second adhesive layer and an optical composite film; the first adhesive layer is located on a first side of the liquid crystal cell; the first polarizer is located on a side of the first adhesive layer away from the liquid crystal cell; the second adhesive layer is located on a side of the first polarizer away from the first adhesive layer; the optical
(Continued)

composite film is located on a side of the second adhesive layer away from the first polarizer; the first adhesive layer adheres the first polarizer onto the liquid crystal cell, the second adhesive layer adheres the optical composite film onto the first polarizer, and the optical composite film includes diffusion particles.

14 Claims, 8 Drawing Sheets

(58) Field of Classification Search
USPC .............................................. 349/58, 65, 112
See application file for complete search history.

(56) References Cited

U.S. PATENT DOCUMENTS

| | | | | |
|---|---|---|---|---|
| 2016/0062015 | A1 | 3/2016 | Yan et al. | |
| 2016/0062524 | A1 | 3/2016 | Tang et al. | |
| 2023/0017835 | A1 | 1/2023 | Lee et al. | |
| 2023/0176422 | A1* | 6/2023 | Kamoshida | G02F 1/13362 349/64 |
| 2024/0160060 | A1* | 5/2024 | Yang | G02F 1/133504 |
| 2024/0176188 | A1* | 5/2024 | Son | G02F 1/133608 |

FOREIGN PATENT DOCUMENTS

| | | | |
|---|---|---|---|
| CN | 104267456 | A | 1/2015 |
| CN | 206321908 | U | 7/2017 |
| CN | 105005108 | B | 8/2017 |
| CN | 108646334 | A | 10/2018 |
| CN | 108828836 | A | 11/2018 |
| CN | 208753324 | U | 4/2019 |
| CN | 111320936 | A | 6/2020 |
| CN | 112782797 | A | 5/2021 |
| CN | 217060555 | U | 7/2022 |
| CN | 217238572 | U | 8/2022 |
| CN | 115480333 | A | 12/2022 |
| JP | 2010191090 | A | 9/2010 |

* cited by examiner 5312
5311
531A
531H 533C
533
532
531B
531C
531A
531
531D
5313
535
5314

533
533C
532
531B
531
531A
535

LIQUID CRYSTAL PANEL AND MANUFACTURING METHOD THEREOF AND DISPLAY APPARATUS

TECHNICAL FIELD

Embodiments of the present disclosure relate to a liquid crystal panel and a manufacturing method thereof and a display apparatus.

BACKGROUND

With development of the market, application of display apparatuses in various electronic products is becoming increasingly widespread. The current display apparatuses mainly include liquid crystal display apparatuses and organic light emitting diode display apparatuses.

The organic light emitting display apparatus usually includes organic light emitting units arranged in an array, the organic light emitting units each include an anode, a cathode, and an organic light emitting layer arranged between the anode and the cathode; and thus, the organic light emitting display apparatus can generate a current between the anode and the cathode in each organic light emitting unit to drive an organic light emitting layer for light emitting display.

The liquid crystal display apparatus usually includes a liquid crystal panel and a backlight module that supplies backlight for the liquid crystal panel; the liquid crystal panel includes a polarizer, an array substrate, an opposite substrate arranged opposite to the array substrate, and a liquid crystal layer located between the array substrate and the opposite substrate; the liquid crystal panel can generate an electric field through pixel electrodes in the array substrate to change a rotation direction of liquid crystal molecules in the liquid crystal layer, and cooperate with the polarizer to implement display.

SUMMARY

The embodiments of the present disclosure provide a liquid crystal panel and a manufacturing method thereof and a display apparatus. The liquid crystal panel includes a liquid crystal cell, a first adhesive layer, a first polarizer, a second adhesive layer and an optical composite film; the first adhesive layer is located on a first side of the liquid crystal cell; the first polarizer is located on a side of the first adhesive layer that is away from the liquid crystal cell; the second adhesive layer is located on a side of the first polarizer that is away from the first adhesive layer; the optical composite film is located on a side of the second adhesive layer that is away from the first polarizer; the first adhesive layer adheres the first polarizer onto the liquid crystal cell, the second adhesive layer adheres the optical composite film onto the first polarizer, and the optical composite film includes diffusion particles. Therefore, the liquid crystal panel utilizes the second adhesive layer to adhere the optical composite film onto the first polarizer, which can integrate a diffusion function into the liquid crystal panel, so that optical films such as a diffuser and a homogenizer in the display apparatus adopting the liquid crystal panel can be cancelled, to greatly reduce a thickness of the display apparatus and implement further lightweight design. On the other hand, due to cancellation of the optical films such as the diffuser and the homogenizer, structural complexity of a component such as a middle frame can also be reduced, and even the middle frame can be cancelled, so as to further reduce the thickness.

At least one embodiment of the present disclosure provides a liquid crystal panel, which includes: a liquid crystal cell; a first adhesive layer, located on a first side of the liquid crystal cell; a first polarizer, located on a side of the first adhesive layer that is away from the liquid crystal cell; a second adhesive layer, located on a side of the first polarizer that is away from the first adhesive layer; and an optical composite film, located on a side of the second adhesive layer that is away from the first polarizer, the first adhesive layer adheres the first polarizer onto the liquid crystal cell; the second adhesive layer adheres the optical composite film onto the first polarizer; and the optical composite film includes diffusion particles.

For example, in the liquid crystal panel provided by an embodiment of the present disclosure, the optical composite film further includes at least one anti-reflective layer.

For example, in the liquid crystal panel provided by an embodiment of the present disclosure, the liquid crystal cell includes an array substrate, an opposite substrate, and a liquid crystal layer located between the array substrate and the opposite substrate; and the first adhesive layer is located on a side of the array substrate that is away from the liquid crystal layer.

For example, in the liquid crystal panel provided by an embodiment of the present disclosure, Young's modulus of the second adhesive layer ranges from 200 Kpa to 300 Kpa; an after-stress plastic deformation rate of the second adhesive layer ranges from 0% to 19%; and an after-stress rebound rate of the second adhesive layer ranges from 85% to 92%.

For example, in the liquid crystal panel provided by an embodiment of the present disclosure, the Young's modulus of the second adhesive layer ranges from 250 Kpa to 300 Kpa; the after-stress plastic deformation rate of the second adhesive layer ranges from 0% to 18.9%; the after-stress rebound rate of the second adhesive layer ranges from 85% to 90%.

For example, in the liquid crystal panel provided by an embodiment of the present disclosure, a peel force of the second adhesive layer ranges from 1850 gf/in to 2050 gf/in.

For example, in the liquid crystal panel provided by an embodiment of the present disclosure, a thickness of the second adhesive layer ranges from 50 microns to 125 microns.

For example, in the liquid crystal panel provided by an embodiment of the present disclosure, transmittance of the second adhesive layer is greater than or equal to 90%.

For example, in the liquid crystal panel provided by an embodiment of the present disclosure, a refractive index of the second adhesive layer ranges from 1.400 to 1.500.

For example, in the liquid crystal panel provided by an embodiment of the present disclosure, a Lab value of the second adhesive layer satisfies parameters below: L ranges from 96.5 to 97.1; a* ranges from −0.07 to −0.11; and b* ranges from 0.20 to 0.24.

For example, the liquid crystal panel provided by an embodiment of the present disclosure further includes: a third adhesive layer, located on a second side of the liquid crystal cell, the second side being opposite to the first side; and a second polarizer, located on a side of the third adhesive layer that is away from the liquid crystal cell.

At least one embodiment of the present disclosure further provides a display apparatus, which includes: any one of the abovementioned liquid crystal panel; and a backplate, including a main body portion and a border portion, the liquid crystal panel is arranged opposite to and spaced apart from the main body portion of the backplate.

For example, the display apparatus provided by an embodiment of the present disclosure further includes: a middle frame, fixed with the border portion of the backplate and including a first bearing portion; and a fixing colloid, one end of the fixing colloid is connected with an edge of the liquid crystal panel, and the other end of the fixing colloid is connected with the first bearing portion, to fix the liquid crystal panel onto the middle frame.

For example, the display apparatus provided by an embodiment of the present disclosure further includes: a fixing colloid, the border portion of the backplate includes a second bearing portion; one end of the fixing colloid is connected with an edge of the liquid crystal panel, and the other end of the fixing colloid is connected with the second bearing portion to fix the liquid crystal panel onto the border portion of the backplate.

For example, in the display apparatus provided by an embodiment of the present disclosure, the fixing colloid is arranged in direct contact with the optical composite film of the liquid crystal panel.

For example, in the display apparatus provided by an embodiment of the present disclosure, no diffuser is arranged between the liquid crystal panel and the main body portion of the backplate.

For example, in the display apparatus provided by an embodiment of the present disclosure, no homogenizer is arranged between the liquid crystal panel and the main body portion of the backplate.

For example, the display apparatus provided by an embodiment of the present disclosure further includes: a support column, one end of the support column is fixed with the main body portion of the backplate, and the other end of the support column is arranged in contact with the liquid crystal panel.

For example, the display apparatus provided by an embodiment of the present disclosure further includes: a support base; a support portion, located on the support base; and a transparent support head, located at an end portion of the support portion that is away from the support base, Shore hardness of the transparent support head is lower than Shore hardness of the support portion.

For example, in the display apparatus provided by an embodiment of the present disclosure, the Shore hardness of the transparent support head ranges from of 30 HA to 50 HA.

For example, in the display apparatus provided by an embodiment of the present disclosure, transmittance of the transparent support head is greater than 90%.

For example, in the display apparatus provided by an embodiment of the present disclosure, the support base is an elastic support base, and is configured to have elastic deformation in a direction perpendicular to the main body portion of the backplate.

For example, in the display apparatus provided by an embodiment of the present disclosure, the elastic support base includes: a fixing piece, including a fixing hole, a first edge and a second edge located on both sides of the fixing hole; and a bending clastic piece, including a third edge and a fourth edge; the third edge is connected with the first edge, and the fourth edge is connected with the second edge, forming an elastic deformation space between the bending elastic piece and the fixing piece.

For example, in the display apparatus provided by an embodiment of the present disclosure, a cross-sectional shape of the bending elastic piece includes two arc portions and a connection portion connecting the two arc portions; and the support portion is connected with the connection portion.

For example, in the display apparatus provided by an embodiment of the present disclosure, a ratio of a size of the transparent support head in a direction perpendicular to the main body portion of the backplate to a size of the support column in the direction perpendicular to the main body portion of the backplate ranges from 1/7 to 1/4.

For example, in the display apparatus provided by an embodiment of the present disclosure, the display apparatus includes a display region and a black border region located in the periphery of the display region; and a width of the black border region ranges from 0.4 millimeters to 1.0 millimeters.

For example, the display apparatus provided by an embodiment of the present disclosure further includes: a reflective layer, located on a side of the backplate that is close to the liquid crystal panel; a light emitting element, located on a side of the main body portion that is close to the liquid crystal panel; and a lens component, located on a side of the light emitting element that is close to the liquid crystal panel.

At least one embodiment of the present disclosure provides a manufacturing method of a liquid crystal panel, which includes: providing a liquid crystal cell; providing a first polarizer component, including a first polarizer, a first adhesive layer and a second adhesive layer; the first adhesive layer being adhered onto the first polarizer, and the second adhesive layer being located on a side of the first polarizer that is away from the first adhesive layer; adhering the first polarizer to one side of the liquid crystal cell through the first adhesive layer; and adhering an optical composite film to a side of the first polarizer that is away from the liquid crystal cell through the second adhesive layer, the optical composite film includes diffusion particles.

For example, in the manufacturing method of the liquid crystal panel provided by an embodiment of the present disclosure, the first polarizer component further includes a first release film and a second release film; the first release film is located on a side of the first adhesive layer that is away from the first polarizer; the second release film is located on a side of the second adhesive layer that is away from the first polarizer; and adhering the first polarizer to one side of the liquid crystal cell through the first adhesive layer includes: peeling off the first release film; and adhering the first adhesive layer to one side of the liquid crystal cell.

For example, in the manufacturing method of the liquid crystal panel provided by an embodiment of the present disclosure, adhering an optical composite film to a side of the first polarizer that is away from the liquid crystal cell through the second adhesive layer includes: peeling off the second release film; and adhering the optical composite film to a side of the first polarizer that is away from the liquid crystal cell through the second adhesive layer.

BRIEF DESCRIPTION OF DRAWINGS

In order to more clearly explain the technical scheme of the embodiments of the present disclosure, the following will briefly introduce the drawings of the embodiments. Obviously, the drawings in the following description only relate to some embodiments of the present disclosure, but not limit the present disclosure.

DETAILED DESCRIPTION

In order to make objects, technical details and advantages of embodiments of the present disclosure clear, the technical solutions of the embodiments will be described in a clearly and fully understandable way in connection with the related drawings. It is apparent that the described embodiments are just a part but not all of the embodiments of the present disclosure. Based on the described embodiments herein, those skilled in the art can obtain, without any inventive work, other embodiment(s) which should be within the scope of the present disclosure.

Unless otherwise defined, all the technical and scientific terms used herein have the same meanings as commonly understood by one of ordinary skill in the art to which the present disclosure belongs. The terms "first," "second," etc., which are used in the description and claims of the present disclosure, are not intended to indicate any sequence, amount or importance, but distinguish various components. The terms "comprises," "comprising," "includes," "including," etc., are intended to specify that the elements or the objects stated before these terms encompass the elements or the objects listed after these terms as well as equivalents thereof, but do not exclude other elements or objects. Similar words such as "connected" or "connected" are not limited to physical or mechanical connection, but can include electrical connection, whether direct or indirect.

Unless otherwise defined, the features such as "parallel", "vertical" and "identical" used in the embodiments of this disclosure all include the cases of "parallel", "vertical" and "identical" in the strict sense, and the cases of "approximately parallel", "approximately vertical" and "approximately identical" which contain certain errors. For example, the above-mentioned "roughly" can mean that the difference of the compared objects is within 10% or 5% of the average value of the compared objects. When the number of one component or element is not specified in the following of the disclosed embodiment, it means that the component or element can be one or more, or can be understood as at least one. "at least one" means one or more, and "multiple" means at least two.

In the current manufacturing process of a display apparatus, after forming a liquid crystal cell, polarizers need to be adhered on both sides of the liquid crystal cell to form a liquid crystal panel; then, the formed liquid crystal panel is assembled with components such as a backplate, a backlight module, a diffuser, a homogenizer, a middle frame, and a front frame.

Figure 1:
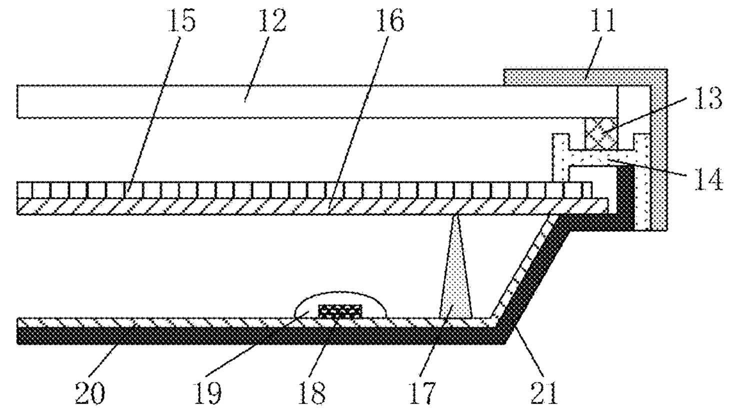
FIG. 1 is a structural schematic diagram of a display apparatus.

FIG. 1 is a structural schematic diagram of a display apparatus. As illustrated by FIG. 1, the display apparatus 10 includes a front frame 11, a liquid crystal panel 12, foam adhesive 13, a middle frame 14, a homogenizer 15, a diffuser 16, a support column 17, a light emitting element 18, a lens component 19, a reflective layer 20, and a backplate 21; the liquid crystal panel 12 is fixed onto the middle frame 14 through the foam adhesive 13, the front frame 11 is arranged at an upper portion and a side portion of an edge of the liquid crystal panel 12; the homogenizer 15 and the diffuser 16 are arranged on a border portion of the backplate 21, the light emitting element 18 and the reflective layer 20 are arranged at a bottom portion of the backplate 21, one end of the support column 17 is fixed with the backplate 21, and the other end of the support column 17 is in contact with the diffuser 16 to support the diffuser 16; the lens component 19 can homogenize and diffuse light emitted by the light emitting element 18, the reflective layer 20 can reflect light back and improve a utilization rate, the diffuser 16 can accept and support the homogenizer 15 and the liquid crystal panel 12, and can also homogenize light while shielding lamp shadow.

In order to further reduce a thickness of the display apparatus and implement further lightweight design, optical films such as the diffuser and the homogenizer can be cancelled and functions thereof can be integrated into the liquid crystal panel, so that the thickness can be greatly reduced. On the other hand, due to cancellation of the optical films such as the diffuser and the homogenizer, structural complexity of a component such as the middle frame can also be reduced, and even the middle frame can be cancelled, so that the thickness can be further reduced.

On the other hand, if the optical films such as the diffuser and the homogenizer are cancelled, the functions thereof need to be integrated into the liquid crystal panel, so an optical composite film with diffusion and homogenization functions can be directly adhered to the polarizer in the liquid crystal panel. However, the usual polarizer component is a single-sided adhesive structure, and when adhered to the liquid crystal cell, it is also needed to use optical adhesive to re-adhere the above-described optical film; on the one hand, cost of optical adhesive is relatively high, and on the other hand, two adhesion processes will reduce manufacturing efficiency; in addition, adhering the optical composite film with the liquid crystal panel may also generate an interference pattern (e.g., a moire pattern and a rainbow pattern). In addition, if the optical films such as the diffuser and/or the homogenizer are cancelled, then the support column will come into direct contact with the liquid crystal panel, and usually, hardness of the support column is relatively high (greater than 35 HD), which can easily scratch the liquid crystal panel.

In this regard, the present disclosure embodiment provides a liquid crystal panel and a manufacturing method thereof and a display apparatus. The liquid crystal panel includes a liquid crystal cell, a first adhesive layer, a first polarizer, a second adhesive layer and an optical composite film; the first adhesive layer is located on a first side of the liquid crystal cell; the first polarizer is located on a side of the first adhesive layer that is away from the liquid crystal cell; the second adhesive layer is located on a side of the first polarizer that is away from the first adhesive layer; the optical composite film is located on a side of the second adhesive layer that is away from the first polarizer; the first adhesive layer adheres the first polarizer onto the liquid crystal cell, the second adhesive layer adheres the optical composite film onto the first polarizer, and the optical composite film includes diffusion particles. Therefore, the liquid crystal panel utilizes the second adhesive layer to adhere the optical composite film onto the first polarizer, which can integrate a diffusion function into the liquid crystal panel, so that the optical films such as the diffuser and the homogenizer in the display apparatus adopting the liquid crystal panel can be cancelled, to greatly reduce a thickness of the display apparatus and implement further lightweight design. On the other hand, due to cancellation of the optical films such as the diffuser and the homogenizer, structural complexity of a component such as a middle frame can also be reduced, and even the middle frame can be cancelled, to further reduce the thickness.

Hereinafter, the liquid crystal panel and the manufacturing method thereof, and the display apparatus provided by the embodiments of the present disclosure will be described in detail in conjunction with the accompanying drawings.

Figure 2A:
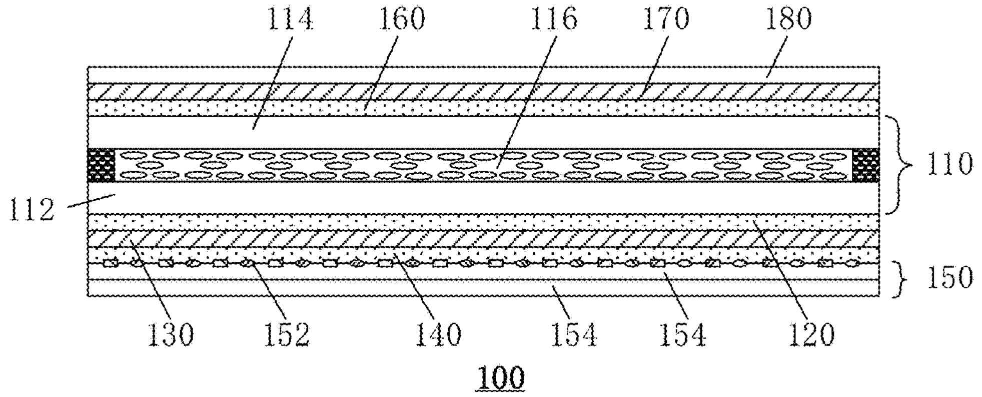
FIG. 2A is a structural schematic diagram of a liquid crystal panel provided by an embodiment of the present disclosure.

FIG. 2A is a structural schematic diagram of a liquid crystal panel provided by an embodiment of the present disclosure. As illustrated by FIG. 2A, the liquid crystal panel 100 includes a liquid crystal cell 110, a first adhesive layer 120, a first polarizer 130, a second adhesive layer 140 and an optical composite film 150; the first adhesive layer 120 is located on a first side of the liquid crystal cell 110; the first polarizer 130 is located on a side of the first adhesive layer 120 that is away from the liquid crystal cell 110; the second adhesive layer 140 is located on a side of the first polarizer 130 that is away from the first adhesive layer 120; the optical composite film 150 is located on a side of the second adhesive layer 140 that is away from the first polarizer 130; the first adhesive layer 120 adheres the first polarizer 130 onto the liquid crystal cell 110, the second adhesive layer 140 adheres the optical composite film 150 onto the first polarizer 130, and the optical composite film 150 includes diffusion particles 152.

In the liquid crystal panel provided by the embodiment of the present disclosure, the second adhesive layer is utilized to adhere the optical composite film onto the first polarizer, the liquid crystal panel can integrate the diffusion function into the liquid crystal panel, so that the optical films such as the diffuser and the homogenizer in the display apparatus adopting the liquid crystal panel can be cancelled, to greatly reduce a thickness of the display apparatus and implement further lightweight design. In addition, due to cancellation of the optical films such as the diffuser and the homogenizer, structural complexity of a component such as a middle frame can also be reduced, and even the middle frame can be cancelled, so that the thickness can be further reduced.

On the other hand, in the display apparatus adopting the liquid crystal panel, due to cancellation of the optical films such as the diffuser and the homogenizer, light loss is also reduced, so that light efficiency of the display apparatus can also be improved, to increase brightness of the display apparatus under same backlight brightness.

In some examples, as illustrated by FIG. 2A, the diffusion particles 152 are arranged on a side of the optical composite film 150 that is close to the first polarizer 130; and a side of the optical composite film 150 that is provided with the diffusion particles 152 is arranged in contact with the second adhesive layer 140.

In some examples, as illustrated by FIG. 2A, the optical composite film 150 further includes at least one anti-reflective layer 154, which can also increase brightness of the display apparatus, so that light efficiency of the display panel is further improved.

For example, as illustrated by FIG. 2A, the optical composite film 150 includes two anti-reflective layers 154; in addition, the above-described anti-reflective layer 154 can be a prism layer. Of course, the embodiments of the present disclosure include but are not limited thereto, and the optical composite film can further include one or more anti-reflective layers, and the anti-reflective layer is not limited to a prism layer.

In some examples, as illustrated by FIG. 2A, the liquid crystal cell 110 includes an array substrate 112, an opposite substrate 114, and a liquid crystal layer 116 located between the array substrate 112 and the opposite substrate 114; the first adhesive layer 120 is located on a side of the array substrate 112 that is away from the liquid crystal layer 116. A thin film transistor can be arranged on the array substrate 112 to drive respective sub-pixels for display; and a color filter can be arranged on the opposite substrate 114 to implement color display. Of course, the embodiments of the present disclosure include but are not limited thereto, and the color filter can also be arranged on the array substrate.

In some examples, as illustrated by FIG. 2A, when the second adhesive layer 140 adheres the optical composite film 150 onto the first polarizer 130, because a surface of the optical composite film 150 has diffusion particles 152 with different particle sizes, an interference pattern, such as a moire pattern, a diagonal pattern, and a rainbow pattern, etc., is easily generated when the optical composite film 150 is fully adhered to the liquid crystal panel 110.

Thus, in order to implement better adhesion, improve brightness, and solve defects such as a rainbow pattern and a diagonal pattern after adhesion, the embodiments of the present disclosure increase stress absorption capability of the second adhesive layer during press fit, reduce irregular deformation during press fit (when light passes through an irregular adhesive surface, light scattering is prone to occur, brightness decreases, and color differences appear when viewed from a side face), strictly control physical parameters of the adhesive layer, increase hard monomer content, reduce deformation of a stressed material, and reduce cross-linking density of a colloid to reduce rebound stress of the colloid, so as to ensure optical quality of the optical composite film after adhesion. When the finally determined second adhesive layer meets parameters below, an interference pattern can be effectively avoided; these parameters include that: Young's modulus of the second adhesive layer ranges from 200 Kpa to 300 Kpa, an after-stress plastic deformation rate of the second adhesive layer ranges from 0% to 19%, and an after-stress rebound rate of the second adhesive layer ranges from 85% to 92%. It should be noted that the above-described plastic deformation rate refers to a ratio of plastic deformation of the second adhesive layer to an original volume of the second adhesive layer, in which the plastic deformation refers to one portion of elastic deformation of the second adhesive layer generated under external force that cannot be restored and thus retained after the external force is removed and the other portion disappears; the after-stress rebound rate is also an important performance indicator for measuring elasticity, expressed as percentage (%); and the greater the value, the higher the elasticity of the colloid.

In some examples, after further optimizing the parameters of the second adhesive layer, when the Young's modulus of the second adhesive layer ranges from 250 Kpa to 300 Kpa, the after-stress plastic deformation rate of the second adhesive layer ranges from 0% to 18.9%, the after-stress rebound rate of the second adhesive layer ranges from 85% to 90%, and the liquid crystal panel can better eliminate an interference pattern such as a moire pattern, a diagonal pattern, and a rainbow pattern.

For example, the Young's modulus of the second adhesive layer ranges from 250 Kpa to 290 Kpa, for example, 270 Kpa; the after-stress plastic deformation rate of the second adhesive layer can be 18.9%, and the after-stress rebound rate of the second adhesive layer can be 90.8%.

In some examples, a peel force of the second adhesive layer ranges from 1850 gf/in to 2050 gf/in, which achieves a good adhesion effect while eliminating an interference pattern.

For example, the peel force of the second adhesive layer can be 1958.07 gf/in.

In some examples, the thickness of the second adhesive layer ranges from 50 microns to 125 microns, for example, 75 microns, 100 microns, and 125 microns. Thus, the second adhesive layer not only has good stress absorption capability and low irregular deformation, but also has high light transmittance, which can reduce light loss and improve brightness of the final product.

In some examples, transmittance of the second adhesive layer is greater than or equal to 90%, for example, 92%, 92.8%, 93%, etc. Thus, the second adhesive layer has high light transmittance, which can reduce light loss and improve brightness of the final product.

In some examples, an atomization degree of the second adhesive layer ranges from 0.15% to 0.23%, for example, 0.16%, 0.17%, 0.18%, 0.19%, 0.20%, etc. Thus, the second adhesive layer has high light transmittance.

In some examples, a refractive index of the second adhesive layer ranges from 1.400 to 1.500, for example, 1.487. Thus, the second adhesive layer can better adhere the optical composite film onto the first polarizer, reduce light refraction, and improve transmittance.

In some examples, a Lab value of the second adhesive layer satisfies parameters below: L ranges from 96.5 to 97.1, for example, 96.93; a* ranges from −0.07 to −0.11, for example, −0.09; b* ranges from 0.20 to 0.24, for example, 0.22. Thus, the second adhesive layer has a smaller color difference, which can reduce color cast and improve display quality. It should be noted that the Lab value is an important color index, mainly composed of three parameters: L, a and b; where, L represents illuminance, equivalent to brightness, a represents a range from red to green, and b represents a range from blue to yellow; when L ranges from 0 to 100, and L=50, it is equivalent to 50% black; a and b both range from +120 to −120, where, +120 a is red, which becomes green when gradually transitioning to −120 a; similarly, +120 b is yellow and −120 b is blue. All colors can be composed of alternating changes in these three values.

It is worth noting that the first adhesive layer can adopt conventional optical adhesive or the same colloid as the second adhesive layer, which will not be limited in the embodiments of the present disclosure.

In some examples, as illustrated by FIG. 2A, the liquid crystal panel 100 further includes a third adhesive layer 160 and a second polarizer 170; the third adhesive layer 160 is located on a second side of the liquid crystal cell 110, and the second side is opposite to the first side, that is to say, the first side and the second side are opposite sides of the liquid crystal cell in a direction perpendicular to the first polarizer; and the second polarizer 170 is located on a side of the third adhesive layer 160 that is away from the liquid crystal cell 110.

For example, when the liquid crystal cell 110 includes an array substrate 112, an opposite substrate 114, and a liquid crystal layer 116 located between the array substrate 112 and the opposite substrate 114, the first side of the liquid crystal cell 110 can be a side of the array substrate 112 of the liquid crystal cell 110 that is away from the liquid crystal layer 116, and the second side of the liquid crystal cell 110 can be a side of the opposite substrate 114 of the liquid crystal cell 110 that is away from the liquid crystal layer 116.

In some examples, as illustrated by FIG. 2A, the liquid crystal panel 100 further includes a protective layer 180, located on a side of the second polarizer 170 that is away from the third adhesive layer 160 to protect the liquid crystal panel.

For example, the protective layer 180 can be made of glass. Of course, the embodiments of the present disclosure include but are not limited thereto.

In some examples, the parameters of the third adhesive layer can be the same as those of the second adhesive layer. Of course, the embodiments of the present disclosure include but are not limited thereto, and the parameters of the third adhesive layer can also be different from those of the second adhesive layer.

FIG. 2B to FIG. 2J are structural schematic diagrams of an optical composite film in a liquid crystal panel provided by an embodiment of the present disclosure.

Figure 2B:
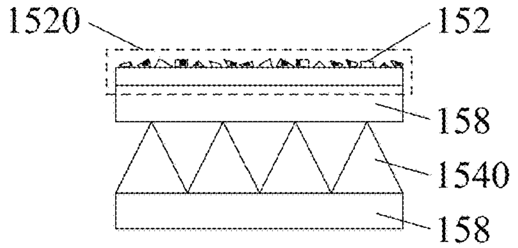
FIG. 2B to FIG. 2J are structural schematic diagrams of an optical composite film in a liquid crystal panel provided by an embodiment of the present disclosure.

As illustrated by FIG. 2B, the optical composite film 150 includes a substrate layer 158, a prism layer 1540, a substrate layer 158, and an atomization layer 1520 which are stacked; a surface of the atomization layer 1520 undergoes atomization to form a plurality of diffusion particles 152; and the prism layer 1540 can serve as the above-described anti-reflective layer. For example, the substrate layer 158 can be made of PolyEthylene Terephthalate (PET).

Figure 2C:
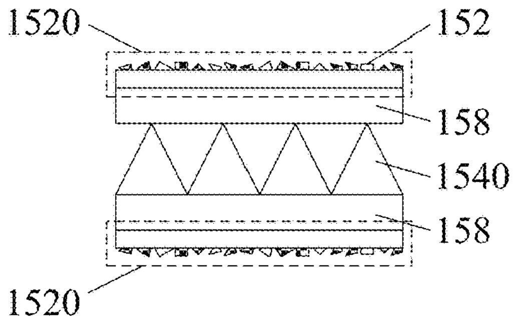

As illustrated by FIG. 2C, the optical composite film 150 includes an atomization layer 1520, a substrate layer 158, a prism layer 1540, a substrate layer 158, and an atomization layer 1520 which are stacked; that is to say, both sides of the optical composite film 150 are each provided with an atomization layer 1520; and a surface of the atomization layer 1520 undergoes atomization to form a plurality of diffusion particles. It should be noted that atomization degrees of the atomization layers 1520 on both sides of the optical composite film 150 can be the same or different.

Figure 2D:
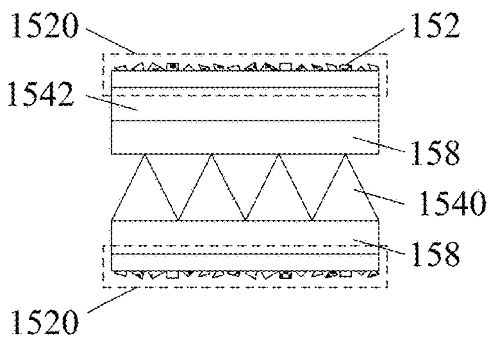

As illustrated by FIG. 2D, the optical composite film 150 includes an atomization layer 1520, a substrate layer 158, a prism layer 1540, a substrate layer 158, a core anti-reflective layer 1542, and an atomization layer 1520 stacked. A surface of the atomization layer 1520 undergoes atomization to form a plurality of diffusion particles 152, and the core anti-reflective layer 1542 and the prism layer 1540 can both serve as anti-reflective layers.

Figure 2E:
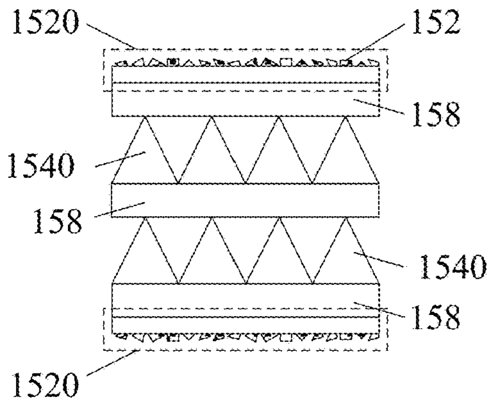

As illustrated by FIG. 2E, the optical composite film 150 includes an atomization layer 1520, a substrate layer 158, a prism layer 1540, a substrate layer 158, a prism layer 1540, a substrate layer 158, and an atomization layer 1520 stacked. Thus, the optical composite film 150 adopts two prism layers 1540 as two anti-reflective layers.

Figure 2F:
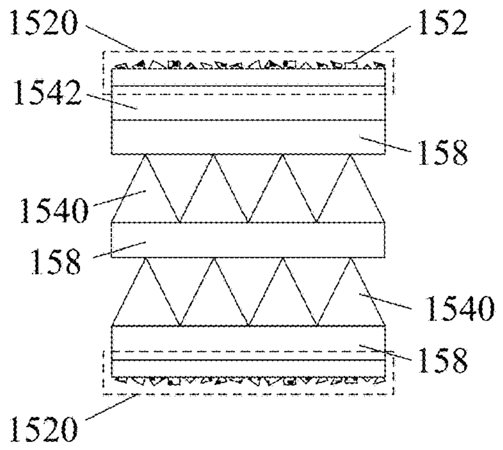

As illustrated by FIG. 2F, the optical composite film 150 includes an atomization layer 1520, a substrate layer 158, a prism layer 1540, a substrate layer 158, a prism layer 1540, a substrate layer 158, a core anti-reflective layer 1542, and an atomization layer 1520 stacked. Thus, the optical composite film 150 adopts two prism layers 1540 and one core anti-reflective layer 1542 as three anti-reflective layers.

Figure 2G:
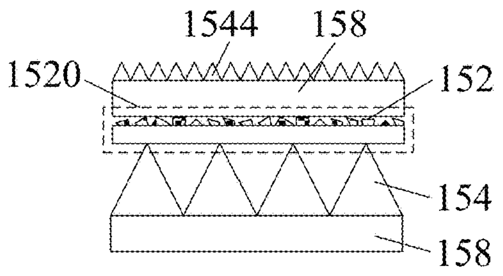

As illustrated by FIG. 2G, the optical composite film 150 includes a substrate layer 158, a lens layer 1540, an atomization layer 1520, a substrate layer 158, and a wave prism 1544 stacked. Thus, the optical composite film 150 can adopt a lens layer 1540 and a wave prism 1544 as two anti-reflective layers.

Figure 2H:
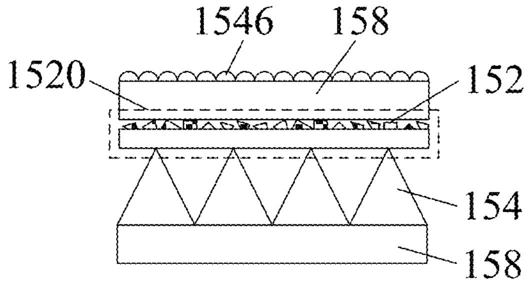

As illustrated by FIG. 2H, the optical composite film 150 includes a substrate layer 158, a lens layer 1540, an atomization layer 1520, a substrate layer 158, and a micro-lens 1546 which are stacked. Thus, the optical composite film 150 can adopt a lens layer 1540 and a micro-lens 1546 as two anti-reflective layers.

Figure 2I:
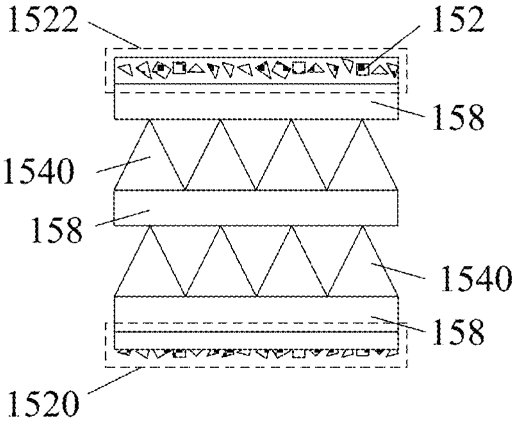

As illustrated by FIG. 2I, the optical composite film 150 includes an atomization layer 1520, a substrate layer 158, a lens layer 1540, a substrate layer 158, a lens layer 1540, and atomization optical adhesive 1522 which are stacked. The atomization layer 1520 and the atomization optical adhesive 1522 both include diffusion particles.

Figure 2J:
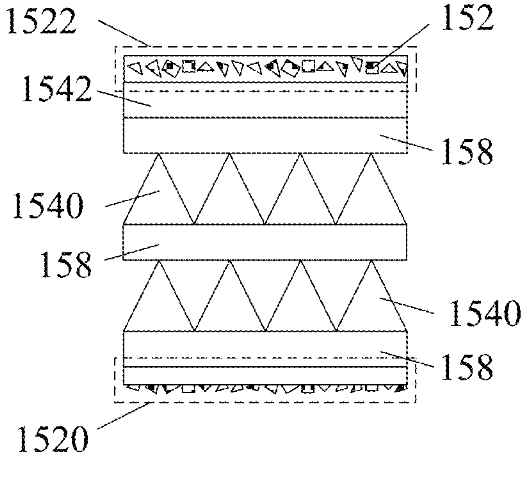

As illustrated by FIG. 2J, the optical composite film 150 includes an atomization layer 1520, a substrate layer 158, a prism layer 1540, a substrate layer 158, a prism layer 1540, a substrate layer 158, a core anti-reflective layer 1542, and atomization optical adhesive 1522 which are stacked. Thus, the optical composite film 150 adopts two prism layers 1540 and a core anti-reflective layer 1542 as three anti-reflective layers, and adopts an atomization layer 1520 and atomization optical adhesive 1522 to implement a diffusion function.

Figure 3:
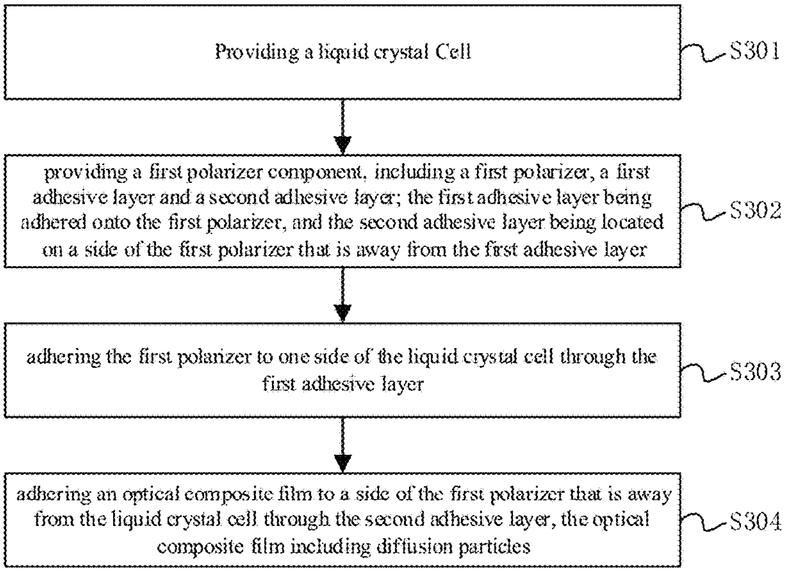
FIG. 3 is a schematic flow chart of a manufacturing method of a liquid crystal panel provided by an embodiment of the present disclosure.

An embodiment of the present disclosure further provides a manufacturing method of a liquid crystal panel. FIG. 3 is a schematic flow chart of a manufacturing method of a liquid crystal panel provided by an embodiment of the present disclosure; and FIG. 4A to FIG. 4D are schematic diagrams of steps of a manufacturing method of a liquid crystal panel provided by an embodiment of the present disclosure. As illustrated by FIG. 3, the manufacturing method of the liquid crystal panel includes steps S301 to S304 below:

Step S301: providing a liquid crystal cell.

Figure 4A:
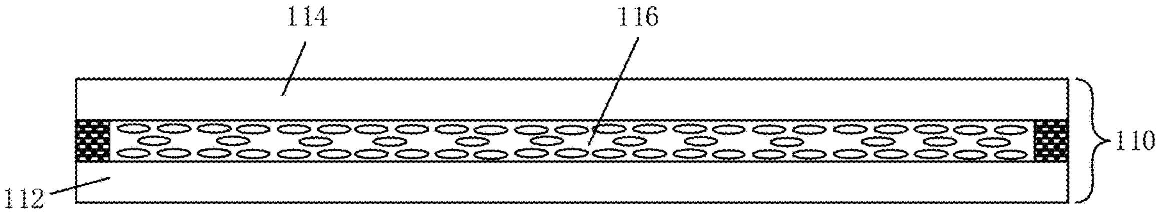
FIG. 4A to FIG. 4D are schematic diagrams of steps of a manufacturing method of a liquid crystal panel provided by an embodiment of the present disclosure.

As illustrated by FIG. 4A, the liquid crystal cell 110 includes an array substrate 112, an opposite substrate 114 arranged opposite to the array substrate 112, and a liquid crystal layer 116 located between the array substrate 112 and the opposite substrate 114.

Step S302: providing a first polarizer component, including a first polarizer, a first adhesive layer and a second adhesive layer; the first adhesive layer being adhered onto the first polarizer, and the second adhesive layer being located on a side of the first polarizer that is away from the first adhesive layer.

Figure 4B:
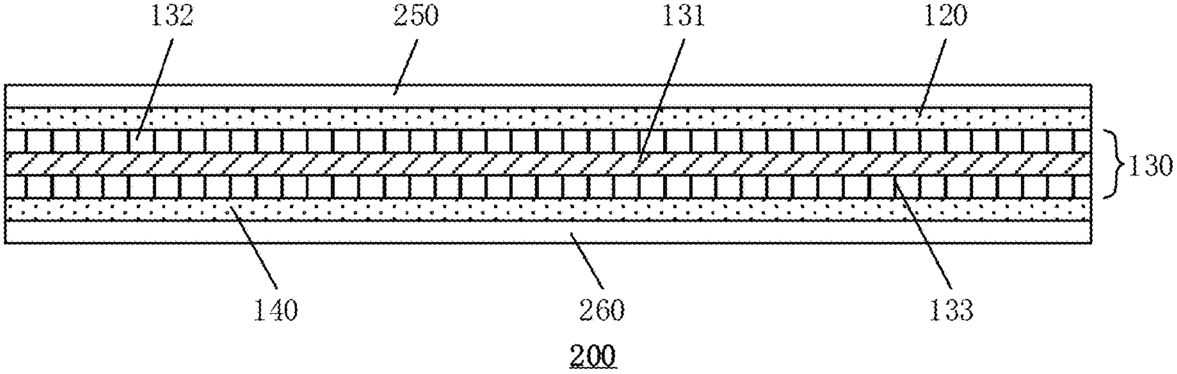

As illustrated by FIG. 4B, the first polarizer component 200 includes a first polarizer 130, a first adhesive layer 120 and a second adhesive layer 140; the first adhesive layer 120 is adhered onto the first polarizer 130, and the second adhesive layer 140 is located on a side of the first polarizer 130 that is away from the first adhesive layer 120.

Step S303: adhering the first polarizer to one side of the liquid crystal cell through the first adhesive layer.

Figure 4C:
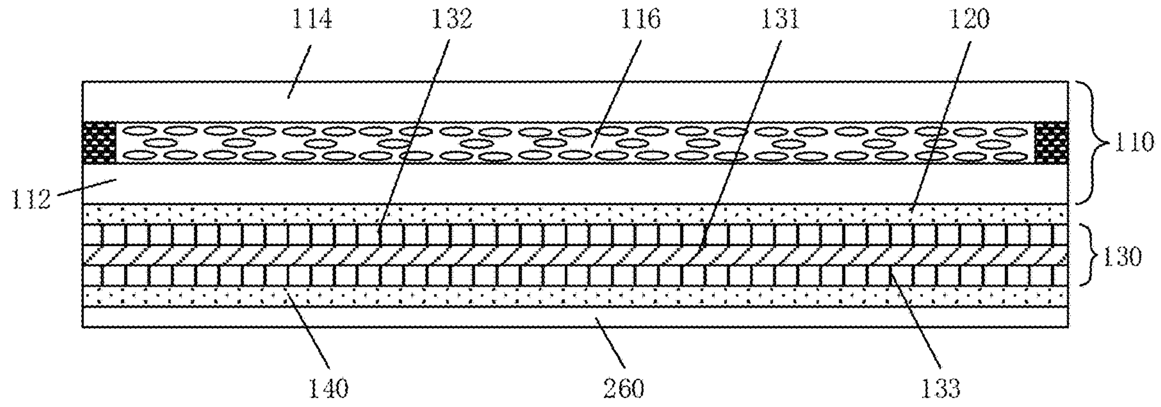

As illustrated by FIG. 4C, the first polarizer 130 is adhered to one side of the liquid crystal cell 110 through the first adhesive layer 120.

Step S304: adhering an optical composite film to a side of the first polarizer that is away from the liquid crystal cell through the second adhesive layer, the optical composite film including diffusion particles.

Figure 4D:
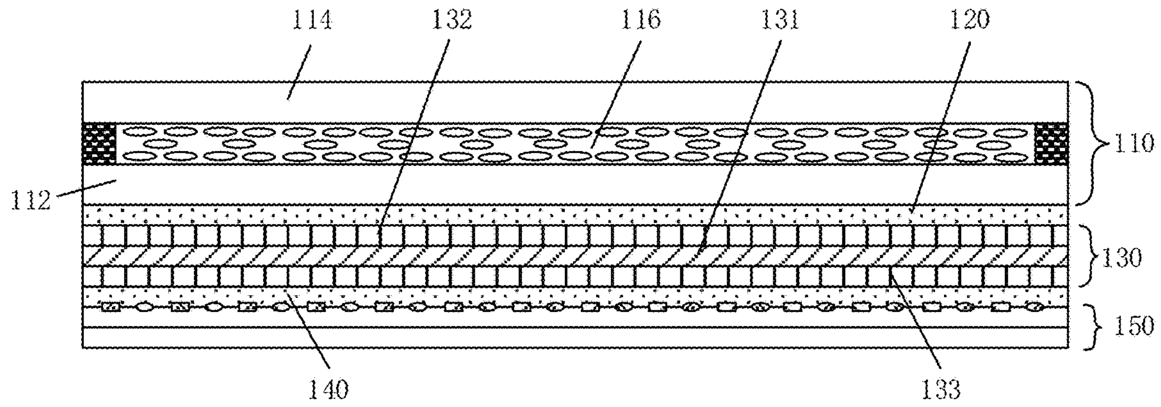

As illustrated by FIG. 4D, an optical composite film 150 is adhered to a side of the first polarizer 130 that is away from the liquid crystal cell 110 through the second adhesive layer 140; and the optical composite film 150 includes diffusion particles 152.

Figure 5:
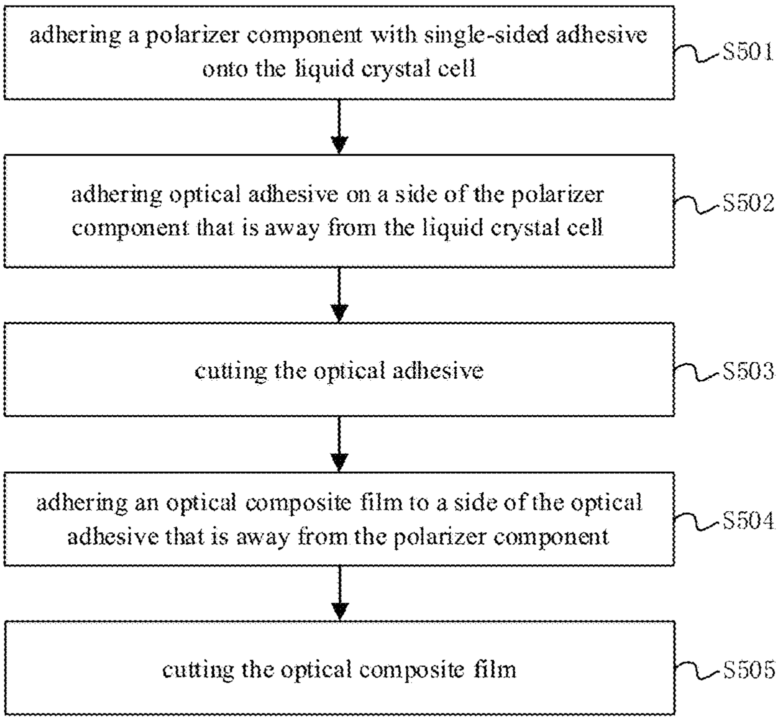
FIG. 5 is a schematic flow chart of a usual manufacturing method of a liquid crystal panel.

FIG. 5 is a schematic flow chart of a usual manufacturing method of a liquid crystal panel, which includes steps of: step S501: adhering a polarizer component with single-sided adhesive onto the liquid crystal cell; step S502: adhering optical adhesive on a side of the polarizer component that is away from the liquid crystal cell; step S503: cutting the optical adhesive; step S504: adhering an optical composite film to a side of the optical adhesive that is away from the polarizer component; and step S505: cutting the optical composite film. It can be seen that in the usual manufacturing process of the liquid crystal panel, after adhesion with the liquid crystal cell, it is also needed to utilize optical adhesive for re-adhering the above-described optical composite film; on the one hand, cost of optical adhesive is relatively high, and on the other hand, two adhesion processes can reduce manufacturing efficiency.

As compared with the usual manufacturing method of the liquid crystal panel shown in FIG. 5, the manufacturing method of the liquid crystal panel provided by the embodiment of the present disclosure, through a polarizer component with double-sided adhesive, can have the optical composite film directly adhered onto the polarizer component after the polarizer component is adhered onto the liquid crystal cell, which, on the one hand, saves optical adhesive, thereby reducing costs, and on the other hand, omits process steps of adhering the optical adhesive and cutting the optical adhesive, so that manufacturing efficiency can be greatly improved.

In addition, in the manufacturing method of the liquid crystal panel provided by the embodiment of the present disclosure, the second adhesive layer is utilized to adhere the optical composite film onto the first polarizer; the liquid crystal panel can integrate the diffusion function into the liquid crystal panel, so that the optical films such as the diffuser and the homogenizer in the display apparatus adopting the liquid crystal panel can be cancelled, to greatly reduce the thickness of the display apparatus and implement further lightweight design. In addition, due to cancellation of the optical films such as the diffuser and the homogenizer, structural complexity of a component such as a middle frame can also be reduced, and even the middle frame can be cancelled, so that the thickness can be further reduced. On the other hand, due to cancellation of the optical films such as the diffuser and the homogenizer, light loss is also reduced, so that light efficiency of the display apparatus can also be improved, to increase brightness of the display apparatus under same backlight brightness.

In some examples, as illustrated by FIG. 4B, the first polarizer component 200 further includes a first release film 250 and a second release film 260; the first release film 250 is located on a side of the first adhesive layer 120 that is away from the first polarizer 130, and the second release film 260 is located on a side of the second adhesive layer 140 that is away from the first polarizer 130. At this time, the above-described step S303 includes: peeling off the first release film 250; and adhering the first adhesive layer 120 to one side of the liquid crystal cell 110.

In some examples, as illustrated by FIG. 4B, the first polarizer component 200 further includes a first release film 250 and a second release film 260; the first release film 250 is located on a side of the first adhesive layer 120 that is away from the first polarizer 130, and the second release film 260 is located on a side of the second adhesive layer 140 that is away from the first polarizer 130. At this time, the above-described step S304 includes: peeling off the second release film 260; and adhering the optical composite film 150 to a side of the first polarizer 130 that is away from the liquid crystal cell 110 through the second adhesive layer 140.

An embodiment of the present disclosure further provides a polarizer. FIG. 4B is a structural schematic diagram of a polarizer component provided by an embodiment of the present disclosure. As illustrated by FIG. 4B, the polarizer component 200 includes a polarizer body 130, a first adhesive layer 120, and a second adhesive layer 140; the first adhesive layer 120 is adhered onto the polarizer body 130; the second adhesive layer 140 is located on a side of the polarizer body 130 that is away from the first adhesive layer 120; Young's modulus of the second adhesive layer ranges from 200 Kpa to 300 Kpa; an after-stress plastic deformation rate of the second adhesive layer ranges from 0% to 19%, and an after-stress rebound rate of the second adhesive layer ranges from 85% to 92%.

Thus, the polarizer component can adopt the second adhesive layer that satisfies the above-described parameters to increase stress absorption capability of the second adhesive layer during press fit and reduce irregular deformation during press fit, strictly control physical parameters of the adhesive layer, increase hard monomer content, reduce deformation of a stressed material, and reduce crosslinking density of a colloid to reduce rebound stress of the colloid, so as to ensure optical quality of the polarizer component after adhering the optical composite film.

In some examples, after further optimizing the parameters of the second adhesive layer, when the Young's modulus of the second adhesive layer ranges from 250 Kpa to 300 Kpa, the after-stress plastic deformation rate of the second adhesive layer ranges from 0% to 18.9%, the after-stress rebound rate of the second adhesive layer ranges from 85% to 90%, and the liquid crystal panel can better eliminate an interference pattern such as a moire pattern, a diagonal pattern, and a rainbow pattern.

For example, the Young's modulus of the second adhesive layer ranges from 250 Kpa to 290 Kpa, for example, 270 Kpa; the after-stress plastic deformation rate of the second adhesive layer can be 18.9%, and the after-stress rebound rate of the second adhesive layer can be 90.8%.

In some examples, a peel force of the second adhesive layer ranges from 1850 gf/in to 2050 gf/in, which achieves a good adhesion effect while eliminating an interference pattern.

For example, the peel force of the second adhesive layer can be 1958.07 gf/in.

In some examples, the thickness of the second adhesive layer ranges from 50 microns to 125 microns, for example, 75 microns, 100 microns, and 125 microns. Thus, the second adhesive layer not only has good stress absorption capability and low irregular deformation, but also has high light transmittance, which can reduce light loss and improve brightness of the final product.

In some examples, transmittance of the second adhesive layer is greater than or equal to 90%, for example, 92%, 92.8%, 93%, etc. Thus, the second adhesive layer has high light transmittance, which can reduce light loss and improve brightness of the final product.

In some examples, an atomization degree of the second adhesive layer ranges from 0.15% to 0.23%, for example, 0.16%, 0.17%, 0.18%, 0.19%, 0.20%, etc. Thus, the second adhesive layer has high light transmittance.

In some examples, a refractive index of the second adhesive layer ranges from 1.400 to 1.500, for example, 1.487. Thus, the second adhesive layer can better adhere the optical composite film onto the first polarizer, reduce light refraction, and improve transmittance.

In some examples, a Lab value of the second adhesive layer satisfies parameters below: L ranges from 96.5 to 97.1, for example, 96.93; a* ranges from −0.07 to −0.11, for example, −0.09; b* ranges from 0.20 to 0.24, for example, 0.22. Thus, the second adhesive layer has a smaller color difference, which can reduce color cast and improve display quality.

It should be noted that the first adhesive layer can adopt conventional optical adhesive or the same colloid as the second adhesive layer, which will not be limited here in the embodiment of the present disclosure.

In some examples, as illustrated by FIG. 4B, the polarizer body 130 includes a polarizing film 131 and a first mechanical support film 132 and a second mechanical support film 133 located on both sides of the polarizing film 131.

For example, a material of the polarizing film 131 can include PolyVinyl Alcohol (PVA); and a material of the first mechanical support film 132 and the second mechanical support film 133 can be at least one of cellulose acetate, polyethylene terephthalate, and acrylic.

In some examples, as illustrated by FIG. 4B, the polarizer component 200 further includes a first release film 250 and a second release film 260; the first release film 250 is located on a side of the first adhesive layer 120 that is away from the first polarizer 130, and the second release film 260 is located on a side of the second adhesive layer 140 that is away from the first polarizer 130.

Figure 6:
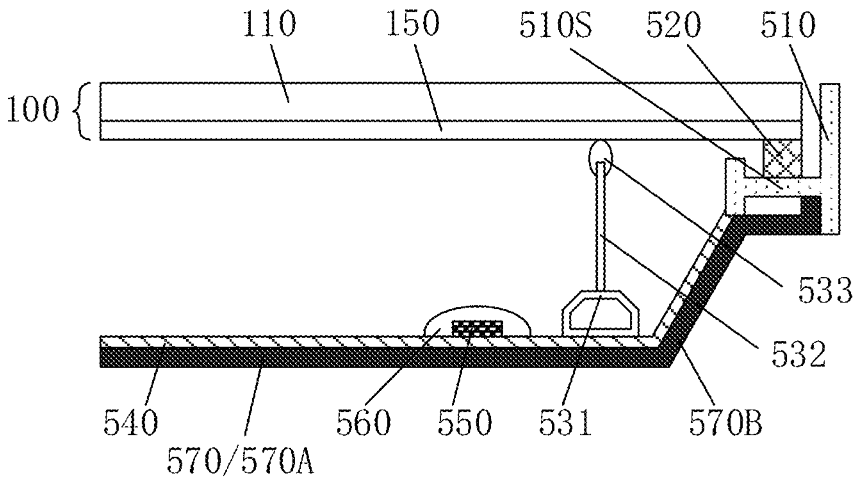
FIG. 6 is a structural schematic diagram of a display apparatus provided by an embodiment of the present disclosure.

An embodiment of the present disclosure further provides a display apparatus. FIG. 6 is a structural schematic diagram of a display apparatus provided by an embodiment of the present disclosure. As illustrated by FIG. 6, the display apparatus 500 includes the liquid crystal panel 100 provided by any one of the above-described examples and a backplate 570; the backplate 570 includes a main body portion 570A and a border portion 570B; and the liquid crystal panel 100 is arranged opposite to and spaced apart from the main body portion 570 of the backplate 570.

In the display apparatus provided by the embodiment of the present disclosure, because the liquid crystal panel utilizes a second adhesive layer to adhere an optical composite film onto the first polarizer, the liquid crystal panel can integrate a diffusion function into the liquid crystal panel, so the display apparatus adopting the liquid crystal panel can cancel optical films such as a diffuser and a homogenizer, to greatly reduce a thickness of the display apparatus, so as to implement further lightweight design. In addition, due to cancellation of the optical films such as the diffuser and the homogenizer, structural complexity of a component such as a middle frame can also be reduced, and even the middle frame can be cancelled, so that the thickness can be further reduced.

On the other hand, in the display apparatus provided by the embodiment of the present disclosure, due to cancellation of the optical films such as the diffuser and the homogenizer, light loss is also reduced, so that light efficiency of the display apparatus can also be improved, to increase brightness of the display apparatus under same backlight brightness.

In some examples, as illustrated by FIG. 6, the display apparatus 500 further includes a middle frame 510 and a fixing colloid 520; the middle frame 510 is fixed with the border portion 570B of the backplate 570 and includes a first bearing portion 510S; one end of the fixing colloid 520 is connected with an edge of the liquid crystal panel 100 (the edge can be a peripheral region of the liquid crystal panel), and the other end of the fixing colloid 520 is connected with the first bearing portion 510S to fix the liquid crystal panel 100 onto the middle frame 510.

For example, the fixing colloid 520 can be foam adhesive, which has both adhesion capability and certain impact resistance. Of course, the embodiments of the present disclosure include but are not limited thereto, and the fixing colloid 520 can also adopt other suitable adhesive, as long as the display panel can be fixed onto the middle frame.

In some examples, as illustrated by FIG. 6, the fixing colloid 520 is arranged in direct contact with the optical composite film 150 of the liquid crystal panel 100.

In some examples, as illustrated by FIG. 6, because the display apparatus 500 adopts the liquid crystal panel 100 integrated with the diffusion function and the brightening function, there is no need to provide a diffuser. At this time, there is no diffuser arranged between the liquid crystal panel 100 and the main body portion 570A of the backplate 570.

In some examples, as illustrated by FIG. 6, there can also be no optical films such as an anti-reflective film and a homogenizer arranged between the liquid crystal panel 100 and the main body portion 570A of the backplate 570. Of course, the embodiments of the present disclosure include but are not limited thereto, and there can also be an optical film such as a homogenizer rather than a diffuser arranged between the liquid crystal panel and the main body portion of the backplate.

In some examples, as illustrated by FIG. 6, the display apparatus 500 further includes a support column 530 for supporting the display panel 100. One end of the support column 530 is fixed with the main body portion 570A of the backplate 570, and the other end of the support column 530 is arranged in contact with the liquid crystal panel 100.

For example, the support column can be fixed to the main body portion of the backplate through fasteners, screws, and other fixing members; of course, the embodiments of the present disclosure include but are not limited thereto, and the support column can also be fixed to the main body portion of the backplate through other means.

In the display apparatus provided by the embodiment of the present disclosure, due to cancellation of the optical films such as the diffuser and the homogenizer, the support column in the display apparatus will be in direct contact with the liquid crystal panel; usually, hardness of the support column is relatively high (greater than 35 HD), which can easily scratch the liquid crystal panel and even cause the liquid crystal panel to break. In this regard, the embodiment of the present disclosure also improves the support column.

In some examples, as illustrated by FIG. 6, because the liquid crystal panel 100 is integrated with the optical composite layer 150, the liquid crystal panel 100 can be fixed into the display apparatus 500 (e.g., the middle frame or the backplate) by using a dispensing process, so as to omit a front frame and reduce the border width. At this time, the display apparatus 500 includes a display region 501 and a black border region 502 located in the periphery of the display region 501; a width of the black border region 502 ranges from 0.4 millimeters to 1.0 millimeters, for example, 0.9 millimeters. Thus, the display apparatus can implement ultra-narrow border design. It should be noted that the above-described width of the black border region refers to a width of the black border region that is located on a single side of the display region, but not a total width of the black border region on both sides of the display region.

In some examples, as illustrated by FIG. 6, the display apparatus 500 further includes a reflective layer 540, a light emitting element 550, and a lens component 560; the reflective layer 540 is located on a side of the backplate 570 that is close to the liquid crystal panel 100, that is to say, the reflective layer 540 can be located on an inner side of the main body portion 570A of the backplate 570, and also on an inner side of the border portion 570B of the backplate 570; the light emitting element 550 is located on a side of the main body portion 570A that is close to the liquid crystal panel 100; and the lens component 560 is located on a side of the light emitting element 550 that is close to the liquid crystal panel 100.

Figure 7:
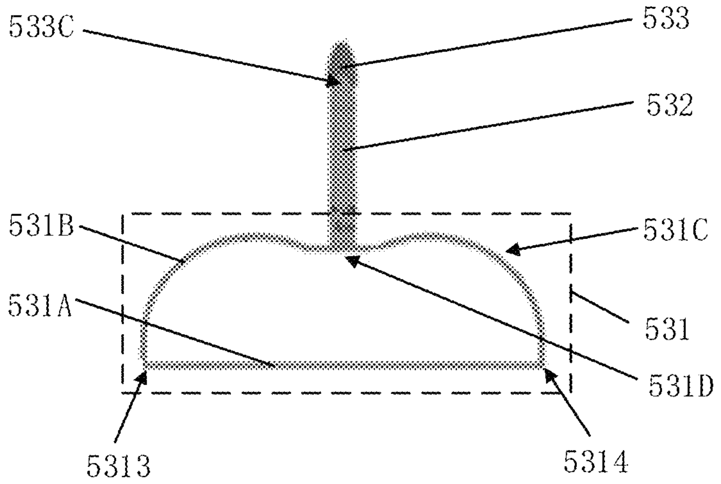
FIG. 7 is a structural schematic diagram of a support column provided by an embodiment of the present disclosure.
Figure 8:
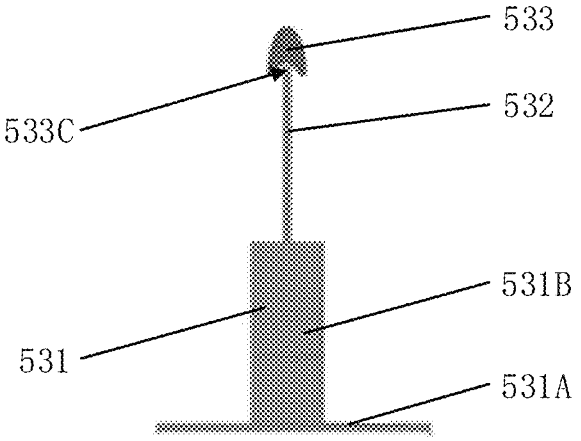
FIG. 8 is a side view of a support column provided by an embodiment of the present disclosure.
Figure 9:
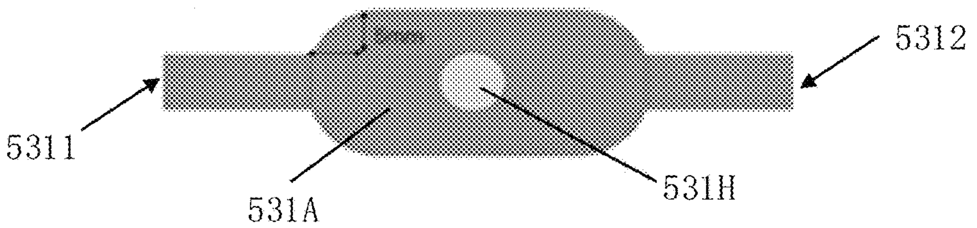
FIG. 9 is a top view of a support column provided by an embodiment of the present disclosure.

FIG. 7 is a structural schematic diagram of a support column provided by an embodiment of the present disclosure; FIG. 8 is a side view of a support column provided by an embodiment of the present disclosure; and FIG. 9 is a top view of a support column provided by an embodiment of the present disclosure.

In some examples, as illustrated by FIG. 6 and FIG. 7, the support column 530 includes a support base 531, a support portion 532, and a transparent support head 533; the support portion 532 is located on the support base 531; the transparent support head 533 is located at an end portion of the support portion 532 that is away from the support base 531, and Shore hardness of the transparent support head 533 is lower than Shore hardness of the support portion 532. Thus, the support portion can be made of a material with higher hardness, while the transparent support head can be made of a material with lower hardness, which can avoid the support column from scratching the liquid crystal panel during vibration test, transportation and use, while maintaining good support performance. On the other hand, because the transparent support head is transparent, it can reduce obstruction of light and avoid formation of point defects. It should be noted that, in usual display apparatuses, due to presence of a diffuser, the support column will not be in direct contact with the liquid crystal panel, but rather supports the diffuser, and then the diffuser supports the liquid crystal panel.

In some examples, the Shore hardness of the transparent support head 533 ranges from of 30 HA to 50 HA. Thus, the transparent support head is relatively soft and can avoid scratching the liquid crystal panel.

In some examples, transmittance of the transparent support head 533 is greater than 90%, which can effectively reduce obstruction of light and avoid formation of point defects.

For example, the support portion 532 can be made of polystyrene, and the transparent support head 533 can be made of Thermoplastic PolyUrethane elastomer (TPU), PolyVinyl Chloride (PVC), etc. Of course, the embodiments of the present disclosure include but are not limited to the above-described specific materials.

In some examples, as illustrated by FIG. 7 and FIG. 8, the transparent support head 533 has a groove 533C on a side that is close to the support portion 532; and an end portion of the support portion 532 is located in the groove 533C and can be fixed with the transparent support head 533C through adhesive.

In some examples, as illustrated by FIG. 6 and FIG. 7, the support base 531 is an elastic support base, and is configured to have elastic deformation in a direction perpendicular to the main body portion 570A of the backplate 570, so as to play a certain role in cushioning when receiving an external force, and further protect the liquid crystal panel. For example, when performing drop and vibration tests on the display apparatus, on the one hand, the transparent support head has lower hardness and can also play a certain role in cushioning; on the other hand, the elastic support base can also deform and contract, so as to play a better role in cushioning and greatly reduce a risk of damage caused by the support column to the liquid crystal panel.

In some examples, as illustrated by FIG. 7, a ratio of a size of the transparent support head 533 in the direction perpendicular to the main body portion 570A of the backplate 570 to a size of the support column 530 in the direction perpendicular to the main body portion 570A of the backplate 570 ranges from 1/7 to 1/4, for example, 1/6. Such setting can allow the support column to better balance support performance and cushioning performance.

In some examples, as illustrated by FIG. 7, FIG. 8 and FIG. 9, the elastic support base 531 includes a fixing piece 531A and a bending elastic piece 531B; the fixing piece 531A includes a fixing hole 531H, a first edge 5311 and a second edge 5312 located on both sides of the fixing hole 531H; the bending elastic piece 531B includes a third edge 5313 and a fourth edge 5314; the third edge 5313 is connected with the first edge 5311, the fourth edge 5314 is connected with the second edge 5312, so that two ends of the bending elastic piece 531B are connected with two ends of the fixing piece 531A, forming an elastic deformation space between the bending elastic piece 531B and the fixing piece 531A. Thus, the elastic support base not only has high cushioning performance, but also has lower weight.

For example, as illustrated by FIG. 7, FIG. 8 and FIG. 9, both the fixing piece 531A and the bending elastic piece 531B can be thin sheets with a thickness of 1 millimeter.

For example, as illustrated by FIG. 7, FIG. 8 and FIG. 9, the fixing piece 531A and the bending elastic piece 531B can be formed integrally with a same material. Of course, the embodiments of the present disclosure include but are not limited thereto.

In some examples, as illustrated by FIG. 7, a cross-sectional shape of the bending elastic piece 531B includes two arc portions 531C and a connection portion 531D connecting the two arc portions 531C; and the support portion 532 is connected with the connection portion 531D. Thus, the two arc portions can have better deformation and have better restoration capability.

In some examples, as illustrated by FIG. 7, a ratio of a size of the transparent support head 533 in a direction perpendicular to the fixing piece 531A to a size of the support column 530 in the direction perpendicular to the fixing piece 531A ranges from 1/7 to 1/4, for example, 1/6. Such setting allows the support column to better balance support performance and cushioning performance.

For example, as illustrated by FIG. 7, the size of the transparent support head 533 in the direction perpendicular to the fixing piece 531A can be approximately 5 millimeters; and the size of the support column 530 in the direction perpendicular to the fixing piece 531A can be approximately 30 millimeters.

In some examples, as illustrated by FIG. 7 and FIG. 8, a ratio of a size of the arc portion 531C in the direction perpendicular to the fixing piece 531A to a size of the support column 530 in the direction perpendicular to the fixing piece 531A ranges from 1/4 to 3/4, for example, 1/2, and thus has good cushioning performance.

For example, the size of the arc portion 531C in the direction perpendicular to the fixing piece 531A can be approximately 15 millimeters; and the size of the support column 530 in the direction perpendicular to the fixing piece 531A can be approximately 30 millimeters.

For example, a width of the arc portion 531C in a direction parallel to the fixing piece 531A can be approximately 13 millimeters; a width of the support portion in the direction parallel to the fixing piece 531A can be approximately 8 millimeters; and a width of the support portion 532 in the direction parallel to the fixing piece 531A can be approximately 4 millimeters.

For example, the arc portion 531C can include a circular arc portion with a curvature radius of 10 millimeters and a vertical portion with a height of 5 millimeters.

In some examples, as illustrated by FIG. 9, a shape of the fixing piece 531A can be composed of a rounded rectangle and rectangles located on both sides of the rounded rectangle; at this time, the fixing piece 531A can include a rounded rectangle portion 501 and rectangle portions 502 located on both sides of the rounded rectangle portion 501. The fixing hole 531H can be located in the rounded rectangle portion 501, while the first edge 5311 and the second edge 5312 are edges of the two rectangle portions 502 that are away from the rounded rectangle portion 501.

For example, as illustrated by FIG. 9, a length of the rounded rectangle portion 501 can be approximately 20 millimeters, and a length of the rectangle portion 502 can be approximately 7 millimeters; a width of the rounded rectangle portion 501 can be approximately 15 millimeters, and a width of the rectangle portion 502 can be approximately 5 millimeters.

For example, as illustrated by FIG. 9, a curvature radius of a rounded corner of the rounded rectangle portion 501 is the same as the width of the rectangle portion 502, and both are approximately 5 millimeters.

Figure 10:
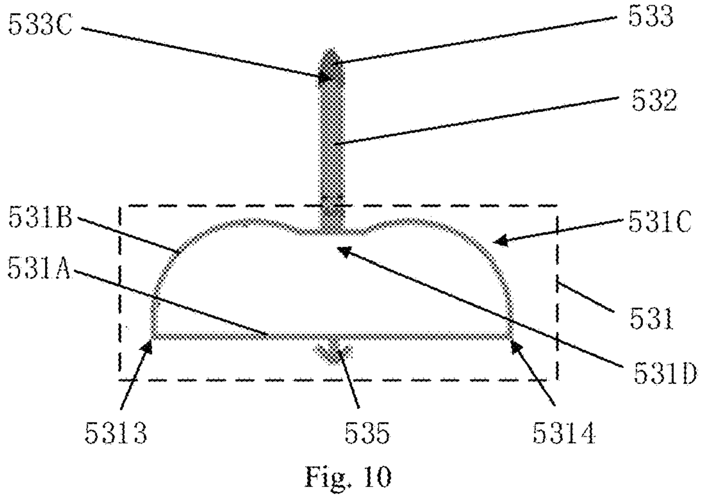
FIG. 10 is a structural schematic diagram of another support column provided by an embodiment of the present disclosure.
Figure 11:
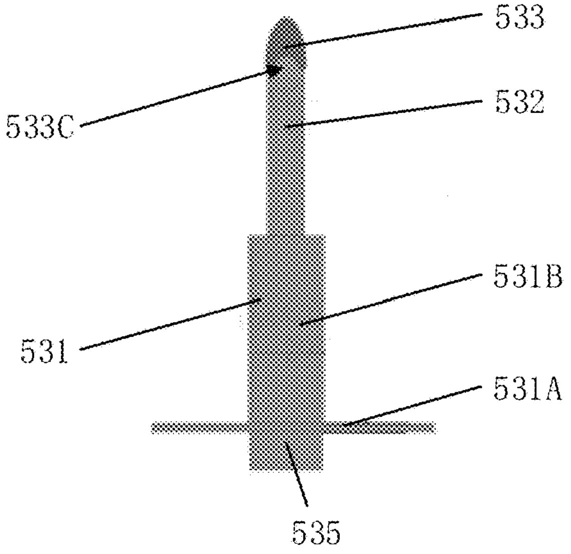
FIG. 11 is a side view of another support column provided by an embodiment of the present disclosure.
Figure 12:
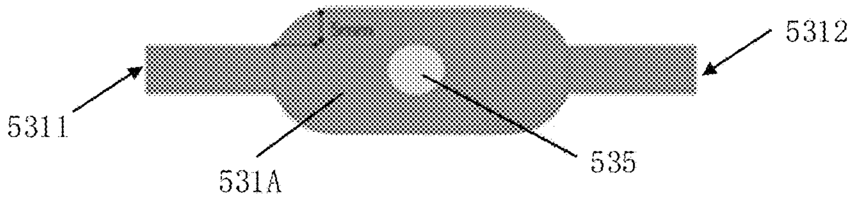
FIG. 12 is a bottom view of another support column provided by an embodiment of the present disclosure.

FIG. 10 is a structural schematic diagram of a support column provided by an embodiment of the present disclosure; FIG. 11 is a side view of a support column provided by an embodiment of the present disclosure; and FIG. 12 is a top view of a support column provided by an embodiment of the present disclosure. As illustrated by FIG. 10, FIG. 11 and FIG. 12, unlike the support column shown in FIG. 7, the support column 530 is fixed to the main body portion 570A of the backplate 570 by adopting a buckle structure 535.

For example, as illustrated by FIG. 10, FIG. 11 and FIG. 12, the buckle structure 535 is located on a side of the fixing piece 531A that is away from the support portion 532 and located at a center of the fixing piece 531A.

For example, as illustrated by FIG. 10 and FIG. 11, the buckle structure 535 and the fixing piece 531A can be integrally formed.

For example, as illustrated by FIG. 10 and FIG. 11, a size of the buckle structure 535 in the direction perpendicular to the fixing piece 531A is approximately 3 millimeters; and a size of the buckle structure 535 in the direction parallel to the fixing piece 531A is approximately 5 millimeters.

Figure 13:
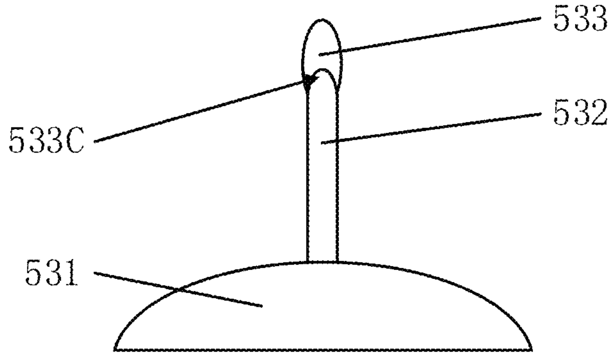
FIG. 13 is a structural schematic diagram of another support column provided by an embodiment of the present disclosure.

FIG. 13 is a structural schematic diagram of another support column provided by an embodiment of the present disclosure. The support column 530 includes a support base 531, a support portion 532 and a transparent support head 533; the support portion 532 is located on the support base 531; the transparent support head 533 is located at an end portion of the support portion 532 that is away from the support base 531; the Shore hardness of the transparent support head 533 is lower than the Shore hardness of the support portion 532; the support base 531 is an elastic support base, and is configured to have elastic deformation in the direction perpendicular to the main body portion 570A of the backplate 570, so as to play a certain role in cushioning when receiving an external force, and further protect the liquid crystal panel. For example, when performing drop and vibration tests on the display apparatus, on the one hand, the transparent support head has lower hardness and can also play a certain role in cushioning; on the other hand, the elastic support base can also deform and contract, so as to play a better role in cushioning and greatly reduce a risk of damage caused by the support column to the liquid crystal panel.

In some examples, as illustrated by FIG. 13, the support base 531 can be made of an elastic material, and thus has a cushioning effect.

Figure 14:
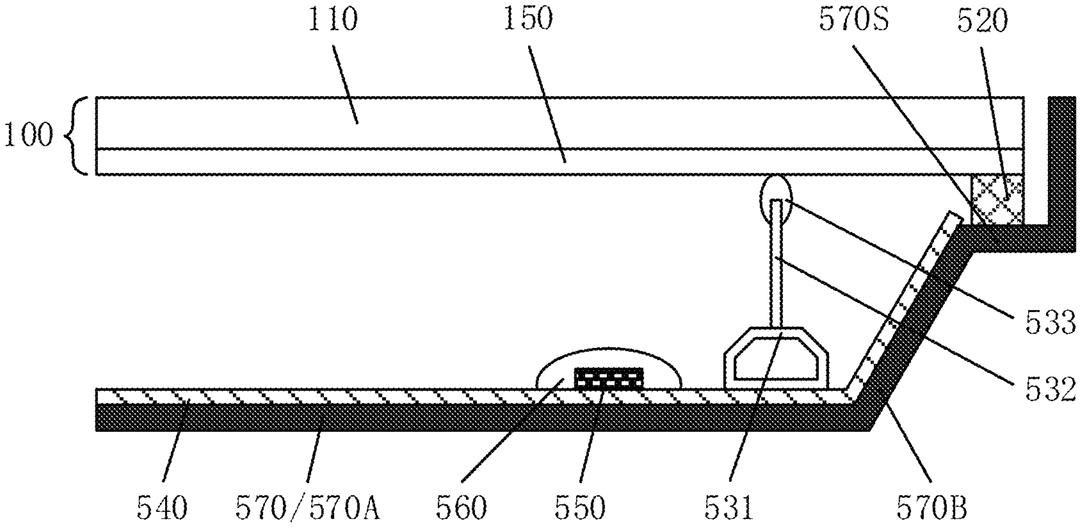
FIG. 14 is a structural schematic diagram of another display apparatus provided by an embodiment of the present disclosure.

FIG. 14 is a structural schematic diagram of another display apparatus provided by an embodiment of the present disclosure. As illustrated by FIG. 14, the display apparatus 500 includes the liquid crystal panel 100 provided by any one of the above-described examples and a backplate 570; the backplate 570 includes a main body portion 570A and a border portion 570B; and the liquid crystal panel 100 is arranged opposite to and spaced apart from the main body portion 570 of the backplate 570.

In the display apparatus provided by the embodiment of the present disclosure, because the liquid crystal panel utilizes a second adhesive layer to adhere an optical composite film onto the first polarizer, the liquid crystal panel can integrate a diffusion function into the liquid crystal panel, so the display apparatus adopting the liquid crystal panel can cancel optical films such as a diffuser and a homogenizer, to greatly reduce a thickness of the display apparatus, so as to implement further lightweight design. In addition, due to cancellation of the optical films such as the diffuser and the homogenizer, structural complexity of a component such as a middle frame can also be reduced, and even the middle frame can be cancelled, so that the thickness can be further reduced.

On the other hand, in the display apparatus provided by the embodiment of the present disclosure, due to cancellation of the optical films such as the diffuser and the homogenizer, light loss is also reduced, so that light efficiency of the display apparatus can also be improved, to increase brightness of the display apparatus under same backlight brightness.

In some examples, as illustrated by FIG. 14, the display apparatus 500 includes a fixing colloid 520; the border portion 570B of the backplate 570 includes a second bearing portion 570S; one end of the fixing colloid 520 is connected with an edge of the liquid crystal panel 100, and the other end of the fixing colloid 520 is connected with the second bearing portion 570S to fix the liquid crystal panel 100 onto the border portion 570B of the backplate 570. Thus, the display apparatus can have the middle frame cancelled, so as to further reduce the thickness of the display apparatus and further implement lightweight design. In addition, since the display apparatus has the middle frame cancelled, costs can also be reduced.

For example, the fixing colloid 520 can be foam adhesive, which has both adhesion capability and certain impact resistance. Of course, the embodiments of the present disclosure include but are not limited thereto, and the fixing colloid 520 can also adopt other suitable adhesive, as long as the display panel can be fixed onto the backplate.

For example, the display apparatus can be a television, a monitor, an electronic picture frame, a digital photo frame, a navigator, a laptop, a tablet personal computer, a smart phone, and any other electronic product having a display function.

The following statements should be noted:

(1) In the accompanying drawings of the embodiments of the present disclosure, the drawings involve only the structure(s) in connection with the embodiment(s) of the present disclosure, and other structure(s) can be referred to common design(s).

(2) In the case of no conflict, features in one embodiment or in different embodiments can be combined.

What have been described above are only specific implementations of the present disclosure, the protection scope of the present disclosure is not limited thereto, and the protection scope of the present disclosure should be based on the protection scope of the claims.

The invention claimed is:

1. A display apparatus, comprising:

a liquid crystal panel; and a backplate, comprising a main body portion and a border portion, wherein, the liquid crystal panel is arranged opposite to and spaced apart from the main body portion of the backplate, the liquid crystal panel comprises:

a liquid crystal cell;

a first adhesive layer, located on a first side of the liquid crystal cell;

a first polarizer, located on a side of the first adhesive layer that is away from the liquid crystal cell;

a second adhesive layer, located on a side of the first polarizer that is away from the first adhesive layer; and an optical composite film, located on a side of the second adhesive layer that is away from the first polarizer, wherein, the first adhesive layer adheres the first polarizer onto the liquid crystal cell; the second adhesive layer adheres the optical composite film onto the first polarizer; and the optical composite film comprises diffusion particles, the diffusion particles are located on a side of the optical composite film close to the first polarizer, and are in contact with the second adhesive layer, the display apparatus further comprises:

a support column, wherein one end of the support column is fixed with the main body portion of the backplate, and the other end of the support column is arranged in contact with the liquid crystal panel, the support column comprises:

a support base;

a support portion, located on the support base; and a transparent support head, located at an end portion of the support portion that is away from the support base, wherein, Shore hardness of the transparent support head is lower than Shore hardness of the support portion.

2. The display apparatus according to claim 1, further comprising:

a middle frame, fixed with the border portion of the backplate and comprising a first bearing portion; and a fixing colloid, wherein, one end of the fixing colloid is connected with an edge of the liquid crystal panel, and the other end of the fixing colloid is connected with the first bearing portion, to fix the liquid crystal panel onto the middle frame.

3. The display apparatus according to claim 1, further comprising:
a fixing colloid,
wherein, the border portion of the backplate comprises a second bearing portion; one end of the fixing colloid is connected with an edge of the liquid crystal panel, and the other end of the fixing colloid is connected with the second bearing portion to fix the liquid crystal panel onto the border portion of the backplate.

4. The display apparatus according to claim 1, wherein, the support base is an elastic support base, and is configured to have elastic deformation in a direction perpendicular to the main body portion of the backplate.

5. The display apparatus according to claim 4, wherein, the elastic support base comprises:
a fixing piece, comprising a fixing hole, a first edge and a second edge located on both sides of the fixing hole; and
a bending elastic piece, comprising a third edge and a fourth edge;
wherein, the third edge is connected with the first edge, and the fourth edge is connected with the second edge, forming an elastic deformation space between the bending elastic piece and the fixing piece.

6. The display apparatus according to claim 1, wherein, the display apparatus comprises a display region and a black border region located in the periphery of the display region; and a width of the black border region ranges from 0.4 millimeters to 1.0 millimeters.

7. The display apparatus according to claim 1, further comprising:
a reflective layer, located on a side of the backplate that is close to the liquid crystal panel;
a light emitting element, located on a side of the main body portion that is close to the liquid crystal panel; and
a lens component, located on a side of the light emitting element that is close to the liquid crystal panel.

8. The display apparatus according to claim 1, wherein the optical composite film further comprises at least one anti-reflective layer.

9. The display apparatus according to claim 1, wherein the liquid crystal cell comprises an array substrate, an opposite substrate, and a liquid crystal layer located between the array substrate and the opposite substrate; and the first adhesive layer is located on a side of the array substrate that is away from the liquid crystal layer.

10. The display apparatus according to claim 1, wherein, Young's modulus of the second adhesive layer ranges from 200 Kpa to 300 Kpa; an after-stress plastic deformation rate of the second adhesive layer ranges from 0% to 19%; and an after-stress rebound rate of the second adhesive layer ranges from 85% to 92%.

11. The display apparatus according to claim 10, wherein the Young's modulus of the second adhesive layer ranges from 250 Kpa to 300 Kpa; the after-stress plastic deformation rate of the second adhesive layer ranges from 0% to 18.9%; the after-stress rebound rate of the second adhesive layer ranges from 85% to 90%.

12. The display apparatus according to claim 10, wherein a refractive index of the second adhesive layer ranges from 1.400 to 1.500.

13. The display apparatus according to claim 10, wherein, a Lab value of the second adhesive layer satisfies parameters below: L ranges from 96.5 to 97.1; a* ranges from −0.07 to −0.11; and b* ranges from 0.20 to 0.24.

14. The display apparatus according to claim 1, further comprising:
a third adhesive layer, located on a second side of the liquid crystal cell, the second side being opposite to the first side; and
a second polarizer, located on a side of the third adhesive layer that is away from the liquid crystal cell.

* * * * *